No. 634,233. Patented Oct. 3, 1899.
H. P. DYER.
APPARATUS FOR TREATING SACCHARINE SOLUTIONS.
(Application filed Dec. 20, 1898.)
(No Model.)
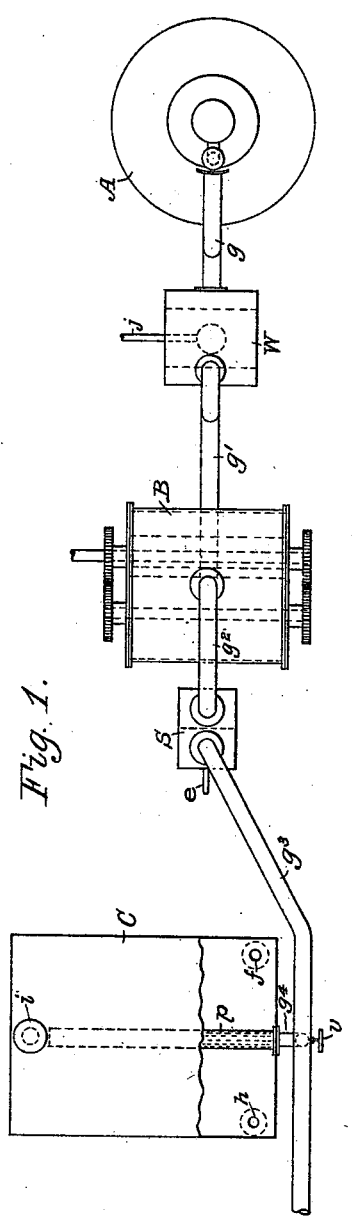
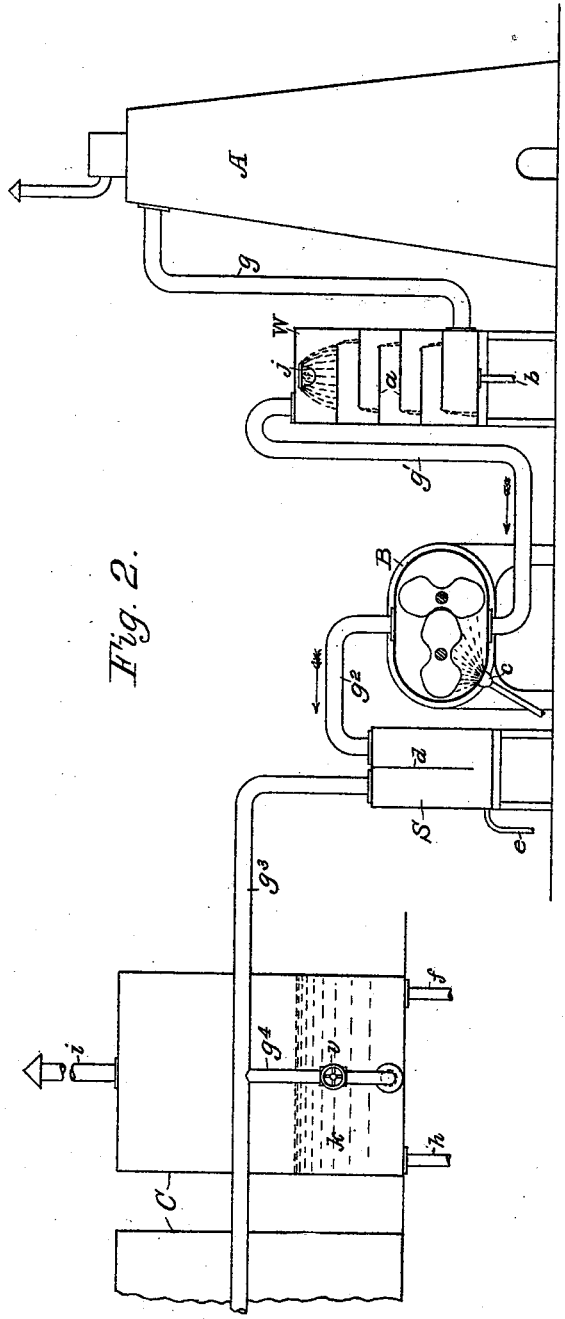
Witnesses,
Geo. H. Wolcott
Herbert H. Copper
Inventor,
Harold P. Dyer,
by
Luther G. Hopper,
Attorney.

UNITED STATES PATENT OFFICE.

HAROLD P. DYER, OF CLEVELAND, OHIO.

APPARATUS FOR TREATING SACCHARINE SOLUTIONS.

SPECIFICATION forming part of Letters Patent No. 634,233, dated October 3, 1899.

Application filed December 20, 1898. Serial No. 699,788. (No model.)

*To all whom it may concern:*

Be it known that I, HAROLD P. DYER, a citizen of the United States of America, and a resident of Cleveland, in the county of Cuyahoga and State of Ohio, have invented certain new and useful Improvements in Apparatus for Treating Saccharine Solutions, of which the following is a specification.

My invention relates to the treatment, for the purpose of purification, of saccharine solutions or juices by what is known as the "carbonation" process, wherein carbonic-acid gas is employed to precipitate that portion of the lime in the liquor which has combined with the sugar.

The object of this invention is to provide apparatus which produces a steady and uniform flow of gas from the kiln into the juice in the carbonating-tanks, thereby not only accomplishing a thorough mixing of gas with the juice, but also securing a pure and uniform quality of gas by reason of the steady draft produced in the kiln.

Further objects are to provide means for separating all impurities out of the gas and for regulating the flow of the same and for performing the operation with less expense for power and attention than has heretofore been necessary.

The accompanying drawings form a part of this specification and represent what I consider the best form of apparatus for carrying out my invention.

In the drawings, Figure 1 is a plan view of the apparatus. Fig. 2 is an elevation of the same with some of the parts shown in section.

The reference-letter A designates a lime-kiln of the ordinary type, in which limestone is burned, producing among other products carbonic-acid gas, which is drawn out through the pipe $g$ by the suction of the blower B and forced by the same through the pipes $g^2$ $g^3$ $g^4$ and perforated pipe $p$ into the saccharine solution contained in the carbonating-tank C.

The blower B is of the rotary type containing revolving pistons or impellers, which sweep close to the sides of the shell and produce a steady and uniform blast, together with sufficient pressure to force the gas into the liquid. Reciprocating pumps do not give a uniform and steady flow, and fan-blowers do not give sufficient pressure for this purpose.

In order to cleanse the gas from the impurities which are carried over with it, I interpose between the blower and the kiln a washer or scrubber W, which is a tank, into the upper part of which a jet of water $j$ is introduced. The water falls down in a spray and runs over a series of plates $a$, falling from one to another till it reaches the bottom of the tank and is drained off through the pipe $b$. The gas is drawn in at the bottom and passes up through the sprays of falling water, which oppose but slight resistance to its passage, but which catch the impurities and carry them off through the drain, while the purified gas is drawn out of the top of the washer through the pipe $g'$ to the blower. The blower may also be provided with a spray of water, as shown at $c$, which answers the double purpose of keeping the joints tight between the blower-pistons and shell, and also further purifies the gas. This water should then be eliminated by means of a separator S, placed between the blower and the carbonator. Gas enters the top of the separator through the pipe $g^2$ and passes down under the vertical plate $d$, the entrained water being deposited upon the bottom of the tank, whence it is carried off by the drain $e$, while the dry gas passes out through the pipe $g^3$.

Several carbonator-tanks C are usually employed, each connected to the pipe $g^3$ by branch pipes $g^4$, in each of which is a shut-off valve $v$. These tanks are partly filled with juice, as shown at $k$, through the inlet $f$, and the juice is withdrawn through the outlet $h$. A ventilator $i$ is provided for the escape of vapor.

The juice of the beet or cane, having been heated to a temperature of about 190° Fahrenheit, is led into the carbonator-tank, where milk of lime is added to it, and this lime combines with the greater part of the impurities and forms an insoluble precipitate. The action of the lime is complex, but it also combines with the sugar, forming a sucrate of lime, which if not decomposed would be lost during filtration. This is done by injecting carbonic acid gas, forming an insoluble precipitate of carbonate of lime. Just enough gas is admitted to break up this combination of lime and sugar. Care is taken not to carry the operation too far, as after the sucrate of lime is destroyed the carbonic acid attacks other compounds of lime and in time would liberate all the impurities again. The process is closely watched, and samples are taken every few seconds as the operation approaches completion. The samples are taken in a test-tube. The proper point at which to stop the flow of carbonic acid gas is shown by the formation of a granular precipitate showing clear liquor between the particles. The gas is then instantly shut off and a test sample is sent to a chemist to determine the percentage of lime remaining in the juice. After carbonation the whole contents of the carbonator, juice and precipitate, are drawn off and forced through filter-presses.

The physical condition of the precipitate is important, for if the operation has been carried on properly the juice will filter rapidly through the filter-presses, leaving a hard lime-cake that is easily washed and cleaned from the presses; but if improperly done there will be a flocculent gelatinous precipitate. The operation being so delicate, it is quite essential to the proper performance of the same that the gas shall be of the best quality and the flow steady and continuous.

The rotary blower and exhauster not only requires less attention and is more economical to operate than the reciprocating slow-speeded pumps used heretofore, but also accomplishes the object of producing a continuous flow of gas, thus improving the quality of the same by the continuous draft set up in the lime-kiln.

The gas-washer, constructed as shown at W, offers no impediment to the steady draft, as do the washers or scrubbers usually employed, in which the gas is forced through a compact body of water and broken rock.

Having thus described my invention, what I claim, and desire to secure by Letters Patent, is—

In apparatus for purifying saccharine solutions, the combination of a kiln in which gas is generated, a gas-washer consisting of a tank in which are sprays of water through which the gas is drawn, a rotary blower or exhauster having revolving impellers which sweep close to the sides of its shell, and means for injecting a spray of water therein, suitable pipe connections between the suction-chamber of the blower and the washer, and between the washer and the kiln, a separator communicating with the outlet of the blower, a tank to hold the saccharine liquid, a suitable gas-injection nozzle in the tank, and a pipe having a shut-off valve connecting the separator with the injection-nozzle, substantially as described.

In testimony whereof I affix my signature, in the presence of two witnesses, at Cleveland, Ohio, December 17, 1898.

HAROLD P. DYER.

Witnesses:
GEORGE B. RILEY,
JOHN F. BRENNAN.